UNITED STATES PATENT OFFICE.

CHARLES E. ACKER, OF NIAGARA FALLS, NEW YORK, ASSIGNOR TO ACKER PROCESS COMPANY, A CORPORATION OF NEW JERSEY.

PROCESS OF PRODUCING OXYGEN COMPOUNDS OF TIN.

No. 824,398.     Specification of Letters Patent.     Patented June 26, 1906.

Application filed June 22, 1905. Serial No. 266,399.

*To all whom it may concern:*

Be it known that I, CHARLES E. ACKER, a citizen of the United States, residing at Niagara Falls, in the county of Niagara and State of New York, have invented certain new and useful Improvements in Processes of Producing Oxygen Compounds of Tin, of which the following is a specification.

This invention is a method of making oxygen compounds of tin, more particularly stannic oxid.

Heretofore tin oxid has been prepared by decomposing an alkali stannate by a suitable acid, by the action of nitric acid upon tin or upon a lower oxid of tin, by precipitating stannic chlorid by means of an alkali hydrate or carbonate, and by roasting tin or a lower oxid thereof at high temperatures. I have now discovered that tin may be precipitated from its chlorid solutions as a hydrated oxid by the action of hypochlorites—such, for instance, as the hypochlorites of the alkali or the alkaline earth metals—and that such precipitation is accompanied by the liberation of chlorin in a state of substantial purity. This strong chlorin is a valuable by-product of my process and may be utilized in any desired manner—as, for instance, for the production of chlorid of tin or of a hypochlorite or for purposes for which dilute chlorin is unsuited.

Hydrated stannic oxid is precipitated by hypochlorites from both stannic-chlorid and stannous-chlorid solutions. In the case of stannic chlorid the reaction may be expressed as follows:

(1) 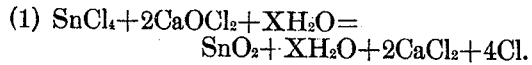
$$SnCl_4 + 2CaOCl_2 + XH_2O = SnO_2 + XH_2O + 2CaCl_2 + 4Cl.$$

If stannous chlorid be used, (2) 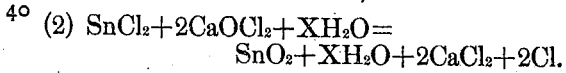
$$SnCl_2 + 2CaOCl_2 + XH_2O = SnO_2 + XH_2O + 2CaCl_2 + 2Cl.$$

In either case the tin is precipitated as a hydrated oxid, carrying an amount of water represented above by the expression $XH_2O$, said amount varying according to the conditions of the precipitation.

It will be seen that an amount of chlorin is liberated equivalent to that combined with the tin. I prefer to employ as the material from which the oxygen compound of tin is precipitated stannic chlorid, ($SnCl_4$,) because a given quantity of hypochlorite liberates therefrom a greater amount of the valuable by-product chlorin than from the stannous salt. As a precipitant I may employ calcium hypochlorite or bleaching-powder or the hypochlorites of magnesium, barium, sodium, potassium, or other alkali or alkaline earth metal.

I will now give an example of the preferred manner of carrying out my process, it being understood, however, that the detailed procedure is given merely by way of example and that my invention is not restricted to such procedure. I add to a solution of stannic chlorid having a specific gravity of about 1.5 a clear solution of calcium hypochlorite containing about fifty grams of available chlorin per liter, said hypochlorite solution being added in the proportion stated in equation 1. These strengths I have found most convenient in practice, though the solutions of stannic chlorid and bleach liquor may be of any desired concentration, or, if desired, the calcium hypochlorite may be added in the form of a dry powder or as a paste to the chlorid solution. The use of a clear solution of hypochlorite from which the impurities have been removed by filtration or settling presents, however, the advantage of yielding a purer product. The solution is preferably agitated during the addition of the hypochlorite solution, and the chlorin, which is liberated in a state of substantial purity and free from air, is collected or utilized as desired. As soon as all the bleach liquor is added and a test shows that the precipitation of the tin is substantially complete the small amount of free chlorin remaining dissolved in the liquor is expelled in whole or in part by blowing air through the mixture. The small quantity of diluted chlorin thus formed should not be permitted to mix with the pure chlorin produced during the precipitation. The hydrated oxid of tin is permitted to settle, is separated from the mother-liquor, washed free from soluble salts, dried, purified, and calcined in the usual manner. If stannous chlorid be used, the procedure is substantially as above described; but, as before stated, less chlorin is evolved.

This application is filed in lieu of forfeited renewal case, Serial No. 217,136, filed July 18, 1904, of original application, Serial No. 184,811, filed December 11, 1903.

I claim—

1. The herein-described method of producing oxygen compounds of tin, which consists in reacting with a hypochlorite upon a chlorid of tin, substantially as described.

2. The herein-described method of producing dioxid of tin, which consists in reacting with a hypochlorite upon a chlorid of tin, thereby precipitating the hydrated oxid of tin, and calcining said hydrated oxid, substantially as described.

3. The herein-described method of producing oxygen compounds of tin, which consists in reacting with a hypochlorite upon stannic chlorid, substantially as described.

4. The herein-described method of producing oxygen compounds of tin, which consists in reacting with calcium hypochlorite upon a chlorid of tin, substantially as described.

5. The herein-described method of producing oxygen compounds of tin, which consists in reacting with calcium hypochlorite upon stannic chlorid, substantially as described.

6. The herein-described method of producing oxygen compounds of tin, which consists in reacting with a solution of calcium hypochlorite upon a chlorid of tin, substantially as described.

7. The herein-described method of producing oxygen compounds of tin, which consists in reacting with a solution of calcium hypochlorite upon stannic chlorid, substantially as described.

8. The herein-described method of producing oxygen compounds of tin and strong chlorin, which consists in reacting with a hypochlorite upon a chlorid of tin, thereby precipitating a hydrated oxid of tin and liberating chlorin, and withdrawing said chlorin without substantial admixture of air, substantially as described.

In testimony whereof I affix my signature in presence of two witnesses.

CHARLES E. ACKER.

Witnesses:
D. T. MACKAY,
GERALDINE M. McBRIDE.